Figure 1:
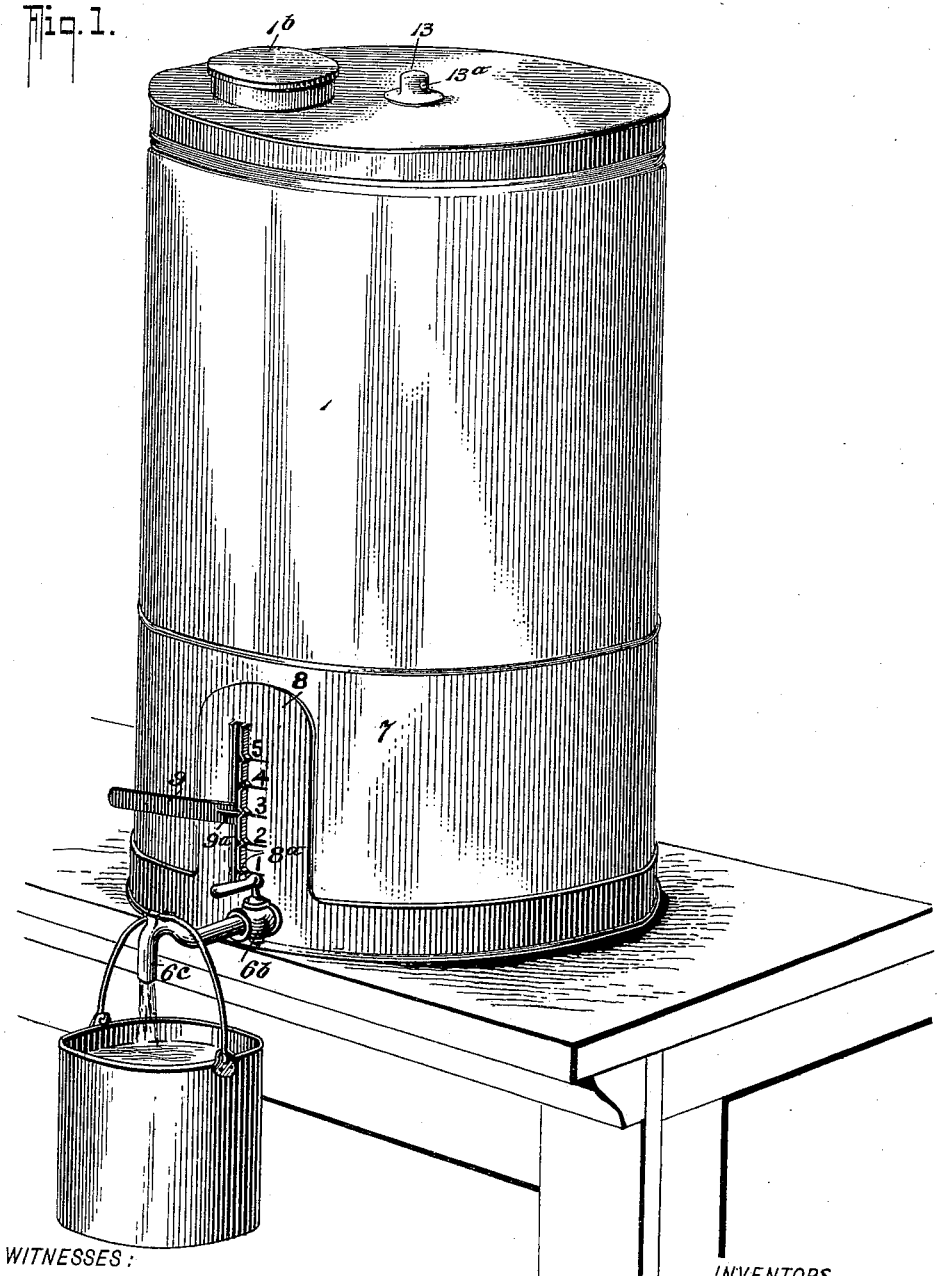

No. 640,081. Patented Dec. 26, 1899.
H. C. BEMAN & F. H. RAYMOND.
SELF MEASURING LIQUID DISPENSING VESSEL.
(Application filed Aug. 3, 1899.)
(No Model.) 3 Sheets—Sheet 1.

WITNESSES:
H. G. Dieterich
Louis Dieterich

INVENTORS
H. C. Beman
F. H. Raymond
BY Fred G. Dieterich & Co.
ATTORNEYS

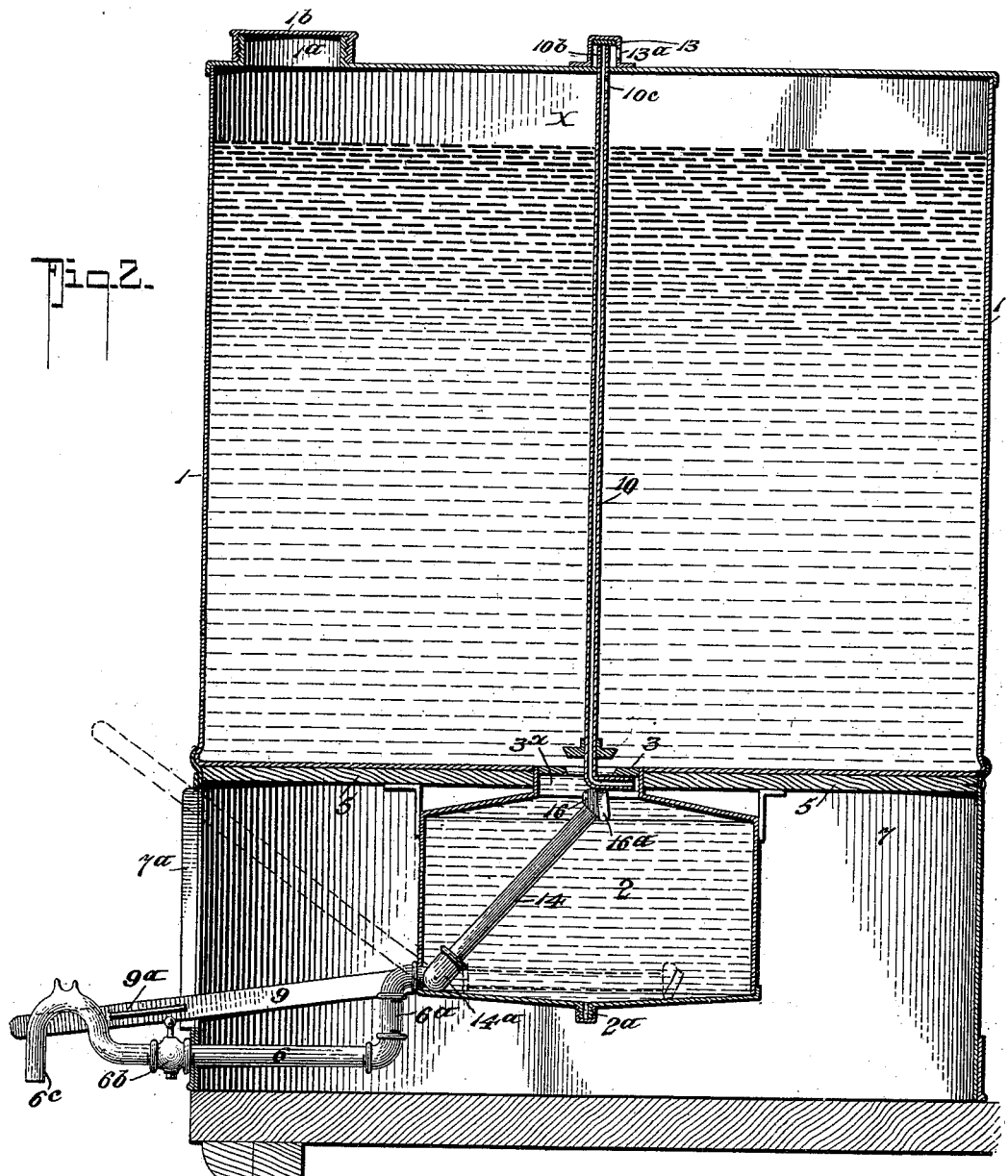

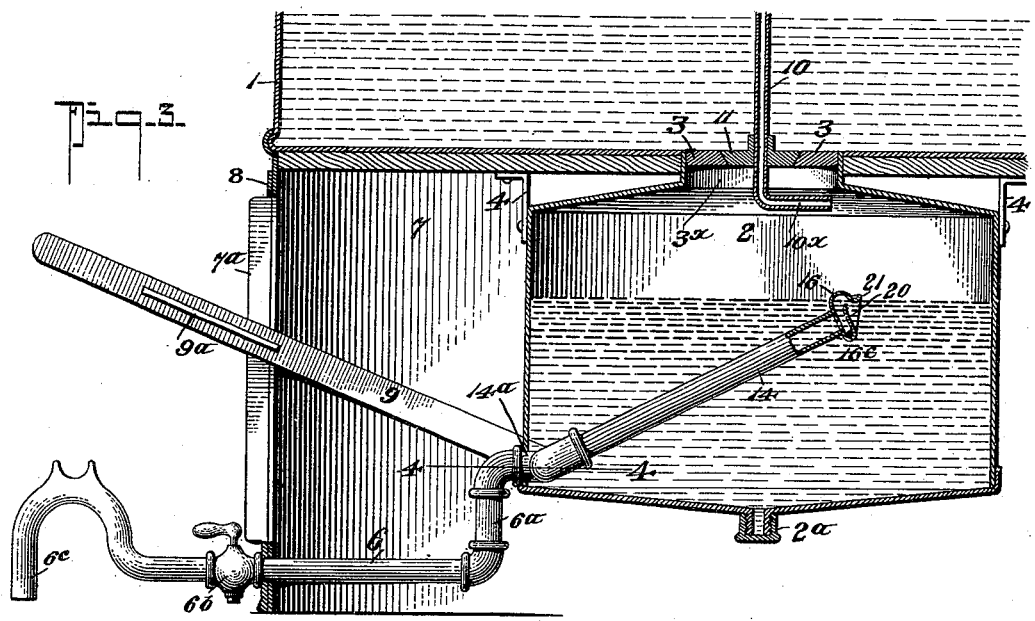

UNITED STATES PATENT OFFICE.

HENRY C. BEMAN AND FRANK H. RAYMOND, OF MEADVILLE, PENNSYLVANIA.

SELF-MEASURING LIQUID-DISPENSING VESSEL.

SPECIFICATION forming part of Letters Patent No. 640,081, dated December 26, 1899.

Application filed August 3, 1899. Serial No. 725,940. (No model.)

*To all whom it may concern:*

Be it known that we, HENRY C. BEMAN and FRANK H. RAYMOND, residing at Meadville, in the county of Crawford and State of Pennsylvania, have invented a new and Improved Self-Measuring Liquid-Dispensing Vessel, of which the following is a specification.

This invention relates to that class of liquid-dispensing vessels having self-measuring devices whereby predetermined measures or quantities less than or equal to that contained in the vessel can be conveniently drawn off without the aid of detached measuring vessels and without waste or evaporation of the fluid.

Primarily our invention seeks to provide an apparatus of the character noted involving a simple and economical construction of parts so arranged that the danger of their being broken or inoperative is reduced to the minimum and the operation of measuring and drawing off the liquid effected by practically a single manipulation.

In its general nature our invention embodies a storage-tank and a measuring vessel in direct communication with the said storage-tank, an automatically-closing valve for cutting off the supply from the storage-tank to the measuring vessel, an offtake-pipe connected to the said vessel, and an adjustable combined measuring and drawing tube arranged to be operated from the exterior of the vessel, connected with and discharging into the offtake-pipe, and constructed, when set to its initial or non-discharging position, to engage with and open the valve that cuts off the storage-tank from the measuring vessel, thereby maintaining the two liquid-holding compartments in constant communication when no liquid is being drawn off.

This invention also comprehends a novel and simple construction for automatically operating an air-feed-controller means for the storage-tank and the measuring vessel.

In its subordinate features this invention consists in certain details of construction and peculiar combination of parts, which will hereinafter be fully described, and specifically pointed out in the appended claims, reference being had to the accompanying drawings, in which—

Figure 1 is a perspective view of our improvement. Fig. 2 is a vertical longitudinal section of the same, the drawing-tube being shown swung up to elevate the cut-off-valve device and open up air communication between the storage-tank and the measuring vessel. Fig. 3 is a detail section, the cut-off valve being shown closed and the drawing-tube set to lead out a given quantity of liquid. Fig. 4 is a detail cross-section of a portion of the feed-pipe and the drawing-tube, taken practically on the line 4 4 of Fig. 3. Fig. 5 is a detail cross-section on the line 5 5 of Fig. 4. Fig. 6 is a front view of the hood or scroll portion of the drawing-tube. Fig. 7 is a transverse section taken on the line 7 7 of Fig. 6. Fig. 8 is a longitudinal section of the said hood, taken on the line 8 8 of Fig. 7; and Fig. 9 is a detail view of the vent-controlling means for the liquid-storage tank and measuring vessel hereinafter referred to.

In its practical construction our invention embodies a storage tank or reservoir 1, adapted to hold a large quantity of liquid, and said reservoir has a filling-opening $1^a$ at the top, normally held closed by a cap $1^b$ to prevent evaporation and the escape of odors therefrom. Reservoir 1 is supported upon a bottom board 5, that extends centrally beneath said reservoir, and the said board and the bottom of the reservoir are apertured to receive a valve-seat 3 and a cupola $3^\times$, that form a part of the receiving-opening of the measuring vessel 2, which in practice is made large enough to hold, say, a maximum amount that a single customer is likely to buy. The receptacle has a dished bottom provided with a drainage-plugged opening $2^a$, and the upper end has brackets 4, whereby to support the said receptacle from the bottom board or plate 5, as best shown in Fig. 3.

6 indicates the offtake-pipe, that extends into the receptacle 2 at the bottom thereof and has a pendent portion $6^a$, terminating in an outwardly-extending discharge member which has an ordinary faucet $6^b$ and a spout $6^c$, the said offtake-pipe being so arranged that when the faucet is open and the drawing-tube, presently referred to, has been properly set the liquid will gravitate through the said faucet and spout.

To give the entire apparatus a neat and attractive appearance and also to provide a suitable gage for setting the measuring-receptacle to discharge the proper quantity of liquid, and, further, to conceal and protect the said receptacle, an annular pendent base-rim 7 is provided, through which the discharge-pipe projects, and adjacent to the said projecting portion of the discharge-pipe the rim 7 has a vertical slotway 7ª and an indicator-plate 8, having a series of notches 8ª numbering from "1" to "5" or otherwise, as may be desired, to designate the number of pints, quarts, or gallons at which the drawing-tube handle 9 is set to permit the drawing off of a corresponding quantity of liquid contained in the receptacle 2 when the faucet 6ᵇ is open.

10 indicates a tubular valve-rod open at the bottom and at the top 10ᵇ, and the lower open end of this tubular rod projects into the top of the receptacle 2 with a right-angle extension 10ˣ. This valve-rod 10 carries a valve 11, adapted to close down on the seat 3 in the bottom of the reservoir 1, and its upper end projects into a tubular vent-dome 13, provided with an air-orifice 13ª at one side, as best shown in Fig. 9. The valve-rod, together with its valve, is normally held down by gravity, augmented by the fluid-pressure in the reservoir, to close the feed-opening to the measuring-receptacle 2, and when so held down the upper end of the valve-rod 10 is free from the top of the dome (see Fig. 9) and affords a proper vent for the receptacle 2 when drawing off liquid therefrom.

14 denotes what we term a "drawing-off tube," the principal function of which is to determine the level or quantity of liquid to be drawn from the receptacle 2, said tube also serving another and essential purpose, that of setting the cut-off valve 11 to its open position when no liquid is being drawn from the receptacle 2, whereby to establish a constant communication between the two holders 1 and 2, thus providing for continuously keeping the receptacle 2 filled except when drawing off a desired quantity.

The tube 14 has a pivoted coupling 14ª, which connects with the offtake-pipe 6 (see Fig. 6) and which is held to a fluid-tight position by suitable means—such, for example, as the coil-spring 15—and the said coupling member 14ª has an elongated port 14ᶜ (see Fig. 5) to maintain an open position between the tube 14 and pipe 6 during any of the positions to which the said tube 14 may be set.

The coupling member 14ª has fixedly attached to it the inner end of the handle 9, which extends outwardly through the slotway in the base-rim 7, and to hold the said handle to any of its set positions it is provided with a detent 9ª, arranged to engage with any one of the notches of the indicator-plate 8, as is clearly shown in Fig. 1.

The construction so far as described operates as follows: Assuming the operator as having just drawn off the desired quantity from the receptacle 2 and as having turned the handle 9 down to the normal point, as indicated in Fig. 2, the movement of such handle will have caused the drawing-tube to rise up, as indicated in said Fig. 2, and engage with the lower end of the tubular valve-rod and raise the valve 11 to its open position, thus opening up the reservoir 1 to the receptacle 2, which then fills quickly. Now, supposing a purchaser to desire, say, three gallons, the operator by a single movement of the handle 9 to the third or No. 3 notch moves the drawing-tube down to the desired level within the receptacle 2, and as the said tube is thus lowered away from the shaft 10 it follows that the said shaft and its valve 11 will drop by gravity and fluid-pressure and close off the reservoir from the receptacle, from which by simply turning on the faucet, as is ordinarily done, the liquid is then drawn off until it reaches the level of the entrant end of the drawing-tube, as illustrated in Fig. 3, when the flow of the said liquid automatically ceases. The operator having thus drawn off the desired quantity closes the faucet and depresses the handle 9 to its normal position, thereby causing the drawing-tube to swing upward against the rod 10 and open the valve 11. It will thus be observed that the operation of filling the receptacle 2 and drawing off the liquid is substantially effected by a single manipulation of the lever-handle 9.

By providing the valve with a long tubular shaft whose upper extremity ends within a small cap or dome, which dome has a suitable packing against which the end of the hollow shaft presses when the valve 11 is raised to the open position, the air is excluded from passing downward through the tubular valve-stem; but when the said valve is closed in position to make a draft the air will have free passage through the orifice 13ª into the valve shaft or stem and through it downward into the top of the receptacle 2, thus giving it vent, and by reason of the orifice in the side of the hollow shaft at a point just below the top of the reservoir 1 when the valve is again opened the air is allowed to pass freely from the said receptacle up into the inner part of the reservoir 1 as the liquid passes down, the liquid and the air thus changing places; but no air is admitted from outside the tank.

By referring now more particularly to Figs. 6, 7, and 8 it will be noticed the inner end of the drawing tube or pipe is provided with a hood or scroll 16, that partially covers it, the rear of said scroll having two openings 16ª on its upper side, one on each end thereof, as best shown in Fig. 8, and a front opening 16ᵇ, (clearly shown in Figs. 6 and 7,) the openings 16ª at the end each having their entrant at the upper side extending down the full height of the scroll portion and discharging into the scroll at a point below the lower edge of the tube, as indicated by Z Z in Fig. 7, the fluid which passes therefrom passing into a trough 16ᶜ, disposed at a plane slightly below the plane indicated by Z Z.

Within the scroll or hood is formed what we term a "double bridge," comprising an inner longitudinal member 20, extending practically over the entrant end of the drawing-tube and terminating in an outwardly-flared flange 20ᵃ, and a second longitudinal member 21, that projects in a plane slightly below the flange 20ᵃ and below the entrant end of the side openings 16ᵃ, as clearly indicated in Fig. 8.

By providing a hood having a double bridge, as described, together with inlets, as stated, the liquid will be positively kept from seeping into the tube after it has been drawn off down to the level of the lower bridge, and to further provide for thus cutting off the liquid the upper end of the openings which connect to the trough are made higher than the lower bridge, so that the liquid will cease to run into the said side openings as it reaches the level of the lower bridge, at which point air is freely admitted to the tube or pipe and the liquid at that level caused to cease running into the tube and outward through its joint and faucet.

From the foregoing description, taken in connection with the accompanying drawings, it is thought the operation and advantages of our invention will be readily understood by those skilled in the art to which it appertains.

It will be observed that after the operator has drawn off the desired quantity should additional quantities be required it would only be necessary to move the lever upward to the notch indicating the additional quantities wanted. When through making drafts, the faucet is closed and the lever pushed down, as before, to its normal position.

A single draft may be made of any quantity from one quart to five gallons or several fractional parts of five gallons, as desired, assuming the receptacle to be constructed to hold such quantity, or by opening the stop-cock without elevating the handle, whereby to leave the valve 11 open, the whole contents of the reservoir 1 may be drawn off at once, thereby making it possible to use the tank as an ordinary faucet-tank or as a self-measuring tank, as may be desired.

In our form of dispensing vessel the drafts are rapid and unvarying and the receptacle is always quickly recharged so long as there is any liquid remaining in the reservoir 1.

The parts are very simple and durable, can be readily assembled, and are so connected as not to become easily disorganized or broken.

By providing the receptacle 2 with a cupola-like extension allows for a proper setting of the valve 3 and the making of small drafts from the receptacle 2.

Having thus described our invention, what we claim, and desire to secure by Letters Patent, is—

1. A liquid-dispensing apparatus, comprising a storage-reservoir having a pendent measuring-receptacle in communication therewith; a gravity-operated tubular valve-stem projected through the top of the reservoir and having its lower end projected at all times into the measuring-receptacle, the ends of the said tube being open and the upper end having a vent communicating with the interior of the reservoir, and a means for governing the outflow of the measuring vessel, adapted when moved to its normal position to elevate the tubular stem and valve.

2. A liquid-dispensing apparatus, comprising in combination; a storage-reservoir and a measuring-receptacle in communication therewith; a vent device for the reservoir and receptacle; an automatically-closing valve for shutting off the measuring-receptacle from the reservoir, and the receptacle having a valve-discharge, and means operated by a single movement for governing the outflow from the measuring-receptacle, said means adapted when moved to its normal or non-drawing-off position to open the aforesaid automatically-closing valve and adjust the vent device, substantially as shown and for the purposes described.

3. An apparatus for the purposes described, comprising a storage-reservoir, and a measuring-receptacle in direct connection therewith; a feed-opening joining the receptacle and the reservoir; an air-vent in the top of the reservoir; a tubular shaft having its upper end operating when moved in one direction to close off the air-vent in the reservoir, said tube having a supplemental vent-opening; a valve on the shaft adapted to engage the feedway and close it; a valved offtake for the measuring-receptacle, and an outflow or drawing tube held to swing within the measuring-receptacle and adapted when swung up to engage and open the valve 11, and cut off the air-vent to the reservoir.

4. An apparatus of the kind stated, having a storage-reservoir, and a measuring-receptacle; a valve-feedway joining the said reservoir and the receptacle, and an automatically-closing valve for the feedway; a means for opening the said valve to fill the measuring-receptacle, of a swinging drawing outflow tube having a hood at its entrant end provided with air-inlet portions disposed just in advance of the cut-off line of the hood, whereby to prevent the fluid trickling into the tube after the predetermined quantity has been drawn off.

5. In an apparatus of the character described; a drawing-off tube, having a hood over its entrant end, said hood having a trough extending across the said entrant end and in a plane below the said end, the side openings extending from the top of the hood and discharging at the bottom of the hood into the liquid-trough, all being arranged substantially as shown and described.

6. In an apparatus of the character described, a drawing-off tube having a hood over its entrant end, said hood having a trough extending across the entrant end of the tube and in a plane below the said end, said hood having a bridge-piece extending above the entrant end of the tube the full length of the hood, and a second bridge-piece overlapping the first bridge-piece and having its end projected in a plane below the end of the first bridge-piece, and inlets at the ends of the hood having their receiving portions at a point above the lowermost bridge-piece and discharging into the trough of the hood at a point in line with the entrant end of the drawing-tube, all being arranged substantially as shown and described.

7. An apparatus for the purpose described, comprising a reservoir mounted upon a suitable support, said reservoir having a filling-opening at the top and a discharge-opening in its bottom; a measuring-receptacle hung from the said support and having a receiving-opening adapted to be held in communication with the discharge of the reservoir, said discharge of the reservoir having a valve-seat; a valve held to automatically close against the said valve-seat; the measuring-receptacle having a valve-discharging faucet, said valve-discharging faucet having a fluid-tight journal-bearing; a drawing-tube or offtake pivotally connected to the bearing of the offtake-pipe and having a handle portion extended to the outside of the apparatus, whereby to manipulate said drawing-tube, the tube having its entrant or receiving portion formed with a guard, said guard being arranged to engage with and elevate the valve that closes off the reservoir from the measuring-receptacle, all being arranged substantially as shown and for the purposes described.

8. An apparatus for the purpose described; comprising a reservoir having a discharge-opening in its bottom; valve automatically closing said discharge-opening said valve having a pendent member projected below the discharge-opening in the reservoir; a measuring-receptacle having an extended receiving mouth or cupola portion in its top into which the pendent portion of the valve projects, said measuring vessel having a discharging-faucet, a supplemental discharge for said vessel, comprising a drawing-tube and an offtake-pipe, said tube being pivotally connected to the offtake-pipe, means for swinging the drawing-tube in a vertical plane said tube being arranged to engage with the pendent portion of the automatically-closing valve and raise it, all being arranged substantially as shown and described.

HENRY C. BEMAN.
FRANK H. RAYMOND.

Witnesses:
A. J. WOODWORTH,
J. B. KIGHTLINGER.